(12) United States Patent
Dong et al.

(10) Patent No.: US 7,742,669 B2
(45) Date of Patent: *Jun. 22, 2010

(54) OPTICAL FIBER PUMP MULTIPLEXER

(75) Inventors: Liang Dong, Ann Arbor, MI (US);
Donald J. Harter, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/017,784

(22) Filed: Jan. 22, 2008

(65) Prior Publication Data

US 2009/0110008 A1    Apr. 30, 2009

Related U.S. Application Data

(63) Continuation of application No. 11/283,701, filed on Nov. 22, 2005, now Pat. No. 7,327,920, which is a continuation of application No. 10/705,817, filed on Nov. 13, 2003, now Pat. No. 7,016,573.

(51) Int. Cl.
G02B 6/04    (2006.01)

(52) U.S. Cl. ................ 385/115; 385/28; 385/121

(58) Field of Classification Search .......... None
See application file for complete search history.

(56) References Cited

U.S. PATENT DOCUMENTS

| | | | |
|---|---|---|---|
| 4,606,020 A | 8/1986 | Ruffin | |
| 4,815,079 A | 3/1989 | Snitzer et al. | |
| 5,751,873 A | 5/1998 | Elias et al. | |
| 5,809,189 A | 9/1998 | Murphy et al. | |
| 5,854,865 A | 12/1998 | Goldberg | |
| 5,864,644 A | 1/1999 | DiGiovanni et al. | |
| 5,999,673 A | 12/1999 | Valentin | |
| 6,434,302 B1 | 8/2002 | Fidric et al. | |
| 6,529,657 B2 | 3/2003 | Goldberg et al. | |
| 6,816,652 B1 | 11/2004 | Lin et al. | |
| 6,823,117 B2 | 11/2004 | Vakili et al. | |
| 7,327,920 B2 * | 2/2008 | Dong et al. | 385/115 |
| 2002/0172478 A1 | 11/2002 | Sahlin | |
| 2003/0128723 A1 | 7/2003 | Bayart et al. | |
| 2003/0202547 A1 | 10/2003 | Fermann et al. | |
| 2005/0094952 A1 | 5/2005 | Gonthier et al. | |

* cited by examiner

*Primary Examiner*—Sung H Pak
(74) *Attorney, Agent, or Firm*—Sughrue Mion, PLLC

(57) ABSTRACT

One or more single mode few-moded or multimode fibers are incorporated into a bundle to carry input to a fiber amplifier or output from a fiber amplifier or a fiber laser. The input is at the signal wavelength, which is the wavelength where amplification or lasing occurs. Each of the fibers in the bundle is cleaved individually or as a group and fiber ends are aligned in the same plane. The fiber amplifier or fiber laser may include a double clad fiber and the other fibers of the bundle couple light for cladding pumping. The device may also include a mode filter for controlling the output mode.

2 Claims, 4 Drawing Sheets

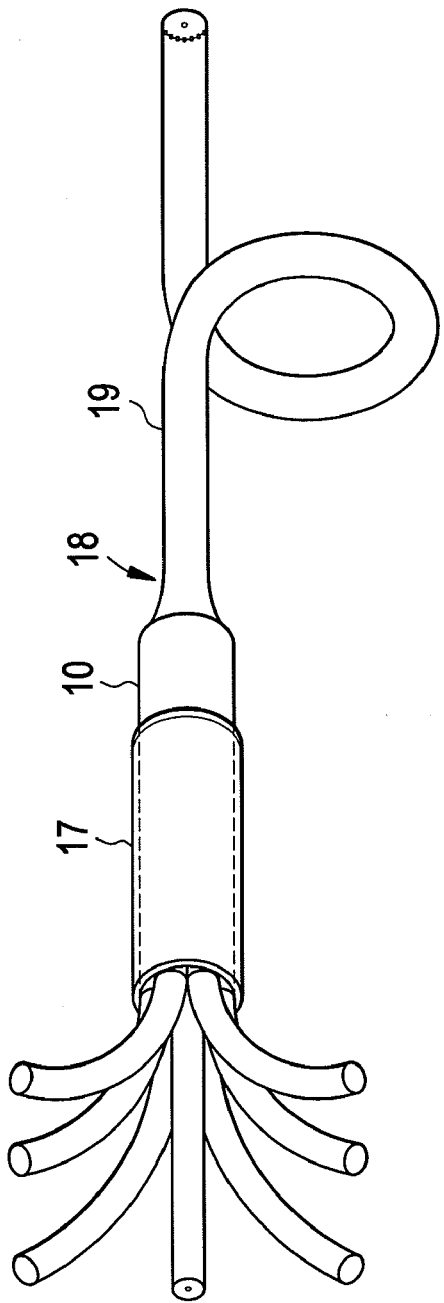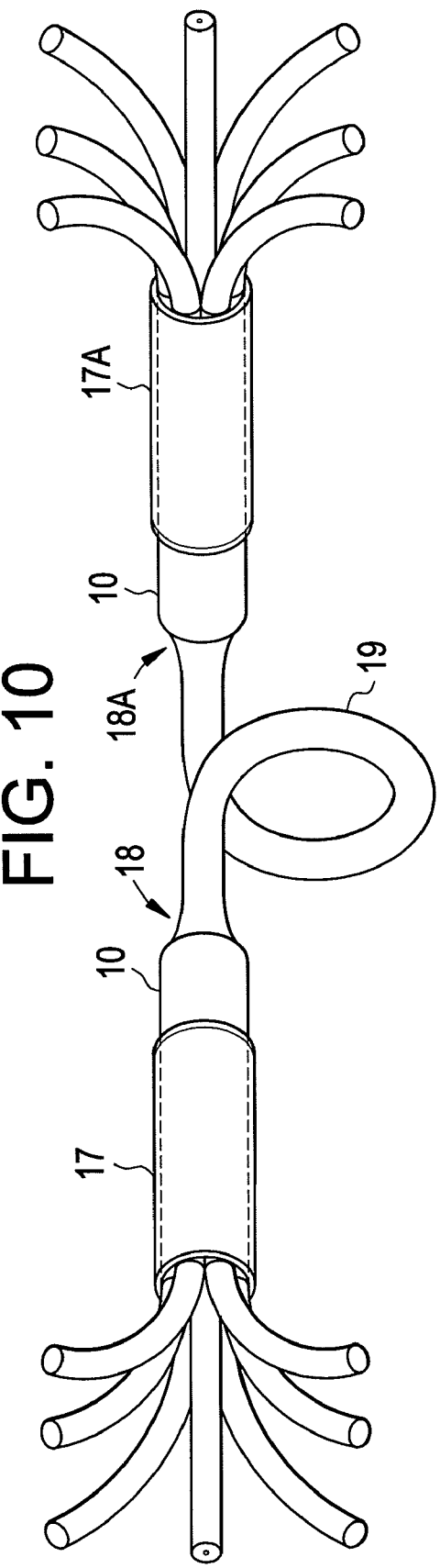

OPTICAL FIBER PUMP MULTIPLEXER

CROSS-REFERENCE TO RELATED APPLICATION

This application is a continuation of U.S. application Ser. No. 11/283,701, filed Nov. 22, 2005, now U.S. Pat. No. 7,327,920, which is a continuation of U.S. application Ser. No. 10/705,817 filed Nov. 13, 2003, now U.S. Pat. No. 7,016,573, the disclosure of which is incorporated herein by reference.

BACKGROUND OF THE INVENTION

1. Technical Field of the Invention

The present invention is directed to an optical fiber bundle, and more specifically, to an assembly comprising an optical fiber bundle spliced to a single optical fiber, and method of manufacturing the assembly.

2. Description of the Related Art

A major issue in high power fiber amplifiers and lasers is how to couple significant optical power from pump diodes into double clad rare earth doped optical fibers, while maintaining access to the input and output of the fiber amplifiers and lasers. US20030202547A1, entitled "Multi-mode fiber amplifier", and hereby incorporated by reference herein, represents an example of this class of devices. This patent describes single mode propagation in multimode fiber, and references such techniques as mode-filtering, the use of few moded fiber, gain-guiding, and other techniques which may find general applicability in connection with the invention.

U.S. Pat. No. 5,854,865 to Goldberg et al. discloses an end-pumping scheme where a high power pump is coupled into the double clad fiber end through beam shaping bulk optics. U.S. Pat. No. 6,529,657 B2 to Goldberg et al. discloses a side-coupling scheme using a polished V-groove at one side of the double clad fiber, along with bulk beam shaping optics. These two approaches are based on very high power pump diodes for very high power fiber lasers, the reliability of which is not yet fully proven. Although theoretically it is possible to scale up these two schemes, in practice, it is very difficult to accomplish.

A number of fiber based solutions have also been proposed. U.S. Pat. No. 5,999,673 to Kapontsev et al. discloses tapering only the multimode pump fiber, and then fusing it to the double clad fiber from the side. U.S. Pat. No. 5,864,644 to DiGiovanni et al. discloses a large number of multimode pump fiber pigtails fused with a single mode fiber in the center and then stretched down to a small diameter. The taper waist is then cut and spliced to the double clad fiber. U.S. Pat. No. 6,434,302 B1 to Fidric et al. discloses that a fused fiber taper is cut beyond the waist, so that the fiber tapers to the small waist and then increases in diameter to a fiber end, which is subsequently spliced to the double clad fiber. This fiber coupler based approach is easy to scale up. Coupling ratios higher than 60:1 has been demonstrated. This allows much more reliable lower power pump diodes to be used to achieve high average power. The elimination of the beam shaping bulk optics and end face where optical power is very large also simplifies the fiber laser structure, and consequently improves its reliability and manufacturability.

As described above, fiber-based approaches are more desirable, due to higher reliability, stability, scalability and manufacturability. However, production of these prior art pump couplers involves complex manufacturing techniques, entailing pulling a few tens of fibers at the same time by highly precise motion controls in a very controlled manner, while the fibers are heated. All the fibers involved have to be tapered adiabatically to avoid major transmission losses. This requires that the heating and stretching of each fiber be well controlled. This gets more difficult as this process scales up to more and more fibers.

SUMMARY OF THE INVENTION

The invention has been made in view of the above circumstances and overcomes the above problems and limitations of the prior art, and provides an optical fiber assembly that has scalability and manufacturing advantages over conventional optical fiber bundles.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

A first aspect of the present invention provides an optical fiber assembly having a fiber bundle with an outer diameter, and a single optical fiber having an outer diameter that is at least equal to the outer diameter of the fiber bundle. The fiber bundle is spliced to the single optical fiber. Preferably, the fiber bundle consists of multimode pump fiber pigtails. In the alternative, the fiber bundle comprises one or more single mode fibers, or one or more few-moded or multi-moded fibers, carrying light at the fundamental mode and at a signal wavelength. Preferably, the fiber bundle comprises a plurality of fibers arranged about a core fiber, and the core fiber can be a single mode fiber or a few-moded or multi-moded fiber carrying single mode signal light. The arrangement of the fibers around the core can be hexagonal, and a holder is used to maintain the hexagonal arrangement prior to the splice being made between the single optical fiber and the fiber bundle. Filler fibers can be used to maintain a hexagonal arrangement.

In standard definition, "single mode" fiber is considered to have $V<2.4$, while "multimode" fiber has a $V>2.4$. Some recent literature suggests a separate category for an intermediate range, between $2.4<V<4.0$, which is termed "few moded". For purposes of the present invention, either of these definitions may apply, unless otherwise noted.

In another aspect of the invention, the optical fiber assembly further comprises a glass capillary that maintains the fiber bundle in a predetermined arrangement. The capillary has an inner diameter that is at least as large as the outer diameter of the fiber bundle, and the inner diameter can be at least as large as the outer diameter of the single optical fiber. This allows the capillary to encase a portion of the fiber bundle, and well as the single optical fiber. Preferably, the capillary has a lower refractive index than the cladding of the fibers in the fiber bundle. Alternatively, a polymer coating can cover the splice between the single optical fiber and the fiber bundle, this polymer coating having a lower refractive index than the cladding of the fibers of the fiber bundle.

A fusion arc or a resistance heater is used to splice the single optical fiber to the fiber bundle. The glass capillary can be collapsed onto the splice either during or after the splicing process.

In another aspect of the present invention, the single optical fiber has a taper in a direction away from the splice between the single optical fiber and the fiber bundle. The taper is sized so the single optical fiber can be spliced to another optical fiber that has a smaller diameter.

Another aspect of the present invention provides a cladding pumped optical fiber device. The device comprises a cladding pumped fiber and a plurality of optical sources for optically pumping the cladding pumped fiber. A plurality of multimode fibers optically couple the optical sources to the cladding pumped fiber, and each multimode fiber is coupled to one of the plurality of optical sources. Each multimode fiber is also coupled to the cladding pumped fiber.

The cladding pumped fiber has a core, which is a region of higher refractive index surrounded by pump wave-guide. The pump wave-guide is a second region with a slightly lower refractive index than that of the core. The pump wave-guide is further surrounded by a third region of even lower refractive index. Optical power carried from the optical sources in the multimode fibers is coupled into the pump wave-guide of the cladding pumped fiber through the fiber bundle splice. If there is signal-carrying fiber in the fiber bundle, the single mode power in the signal-carrying fiber is coupled into the core of the cladding pumped fiber through the fiber bundle splice. This arrangement couples multimode light into the cladding pumped fiber. The device may further include a multimode core fiber that is coupled to the cladding pumped fiber core for coupling single mode light. The plurality of multimode fibers and the multimode core fiber are bundled together to form a fiber bundle. The fiber bundle is tapered to a reduced cross sectional area prior to being coupled to the cladding pumped fiber. The taper of the fiber bundle acts as a mode-converter.

The above and other aspects and advantages of the invention will become apparent from the following detailed description and with reference to the accompanying drawing figures.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

FIG. 9 illustrates an embodiment of the present invention having a single end pumped fiber amplifier or laser.

FIG. 10 illustrates an embodiment of the present invention having a double end pumped fiber amplifier or laser.

DESCRIPTION OF THE PREFERRED EMBODIMENTS

Prior to describing the presently preferred embodiment of the invention, some details concerning the prior art will be provided to facilitate the reader's understanding of the invention and to set forth the meaning of various terms.

A detailed description of the preferred embodiments of the invention will now be given referring to the accompanying drawings.

Figure 1:
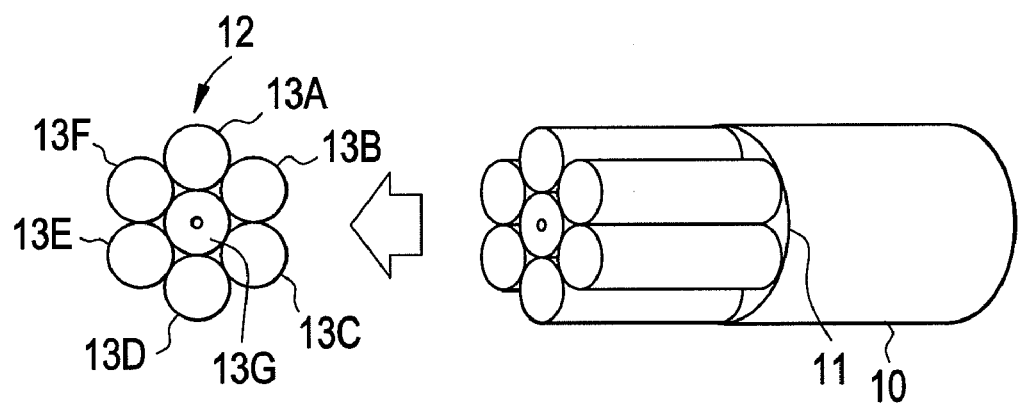
FIG. 1 illustrates an embodiment of the present invention with a 7-fiber bundle, with a signal-carrying fiber in the center.
Figure 2:
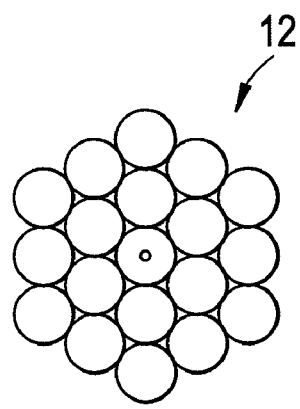
FIG. 2 illustrates an embodiment of the present invention having a 19-fiber bundle stacked in a hexagonal packing arrangement.

Referring to FIG. 1, an embodiment of the present invention is illustrated. The basic embodiment is a multimode pump fiber bundle 12 comprising multimode pump fiber pigtails. One or more single mode or few-moded (FM) fibers can be incorporated into the bundle to carry input to a fiber amplifier or output from a fiber amplifier or a fiber laser. The input to the fiber amplifier is at the signal wavelength, which is the wavelength where amplification or lasing takes place. The core fiber 13G can support only single mode operation or a small number of modes. Each of the fibers 13A-13G in the fiber bundle 12 is cleaved individually and fiber ends are aligned in the same plane. The fiber ends can be aligned in the same plane by pushing against a clean and flat glass surface.

The ends of the fiber bundle 12 can also be prepared by other methods. The fiber bundle 12 can be heated locally in the middle to cause the fibers 13A-13G in the fiber bundle 12 to fuse. The fiber bundle 12 is then cleaved to prepare ends of sufficient quality for splicing. The fiber bundle 12 can alternatively be cut and the fiber ends then cleaned and polished. The fiber bundle 12 can be held together by elastic or metal ring (not shown) some distance away from the end of the fiber bundle 12. The fiber bundle 12 can be held together by epoxy a small distance away from the fiber ends. The fiber bundle 12 can be held together by a glass capillary with its end either aligned with the fiber ends or slightly away from the fiber ends so that the fiber ends are protruding from the capillary.

A double clad fiber 10 with an outer diameter that is either close to or larger than the diameter of the fiber bundle 12 can then be spliced to the fiber bundle. The ends of the fiber bundle 12 are butted against the prepared end 11 of the double clad fiber 10. The double clad fiber 10 and the fiber bundle 12 can be fusion spliced together using an electric arc, or the double clad fiber 10 and the fiber bundle 12 can also be spliced using a resistance heater.

Fusion splicing uses an electric arc that has a precisely controlled duration and intensity. Multiple electrodes and line electrodes may be used to create a large heating zone to accommodate the large size of the fiber bundle 12.

The remainder of the fusion splicing setup is very similar to standard fusion splicing for single mode fibers. Two three-dimensional translation stages with fiber holders hold the fiber bundle 12 and the double clad fiber 10, respectively. The fiber bundle 12 and the double clad fiber 10 are aligned by aligning the ends of the fiber bundle 12 and double clad fiber 10 by looking through a microscopic eyepiece or LCD display. The ends of the fiber bundle 12 and double clad fiber 10 are first cleaned by a weaker arc, and are then brought together in close contact. A strong arc is then used to fuse the fiber bundle 12 and double clad fiber 10 together. The fiber bundle 12 and the double clad fiber 10 are pushed together slightly during the fusion process to ensure proper fusion at the ends.

A commercial large fiber splicer that uses resistance heating is available from Vytran Corporation. The Vytran product uses a process very similar to that described above, except that a resistance heater is used in place of a fusion arc.

Referring to FIGS. 2-5, it is advantageous to arrange the fiber bundle 12 in a hexagonal fashion. This allows high packing density. Other methods of packing can be used as well. If hexagonal packing is used, it is preferred to hold the fiber bundle 12 with a hexagonal shaped metal, plastic or glass holder (not shown). The hexagonal shape of holder allows easy assembly of the fiber bundle 12. The holder can be removed after the splice between the fiber bundle 12 and double clad fiber 10 is completed. If the ends of the fiber bundle 12 are prepared by the fusion and cleaving method described earlier, no holder is required.

Figure 3:
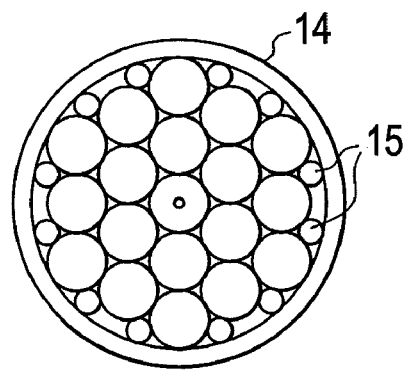
FIG. 3 illustrates an embodiment of the present invention having a 19-fiber bundle stacked in a hexagonal packing arrangement, along with a capillary holder and smaller fibers acting as filler to allow tight packing within the capillary.
Figure 4:
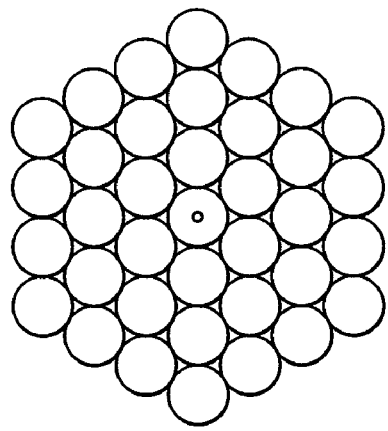
FIG. 4 illustrates an embodiment of the present invention having a hexagonal 37-fiber bundle.
Figure 5:
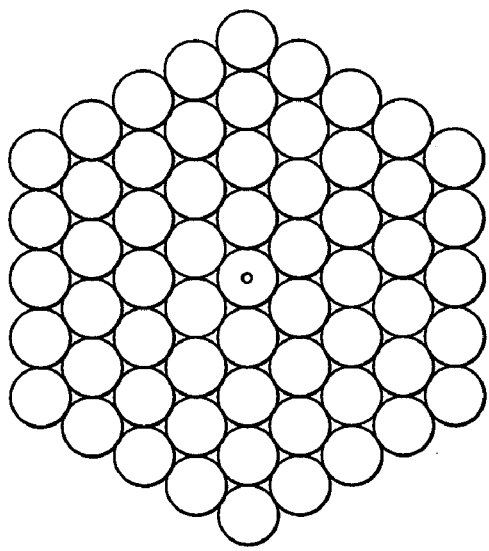
FIG. 5 illustrates an embodiment of the present invention having a hexagonal 61-fiber bundle.

Referring to FIG. 3 illustrates an embodiment of the present invention having a 19-fiber bundle stacked in a hexagonal packing arrangement, along with a capillary 14 and a plurality of smaller fibers 15. The plurality of smaller fibers 15 acts as filler to allow tight packing within the capillary 14. FIGS. 4 and 5 illustrate embodiments of the present invention having a hexagonal 37-fiber bundle and a hexagonal 61-fiber bundle, respectively.

Figure 6:
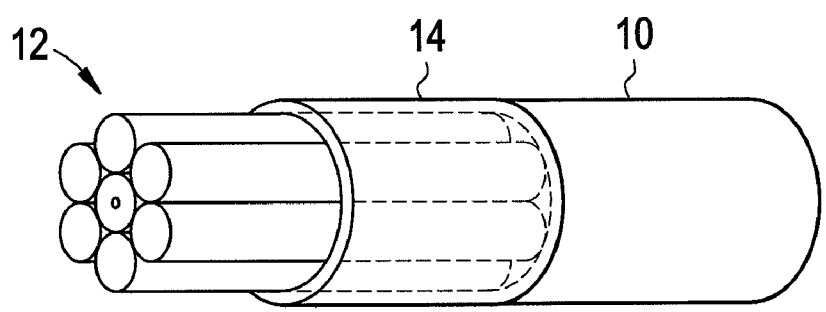
FIG. 6 illustrates an embodiment of the present invention where a glass capillary is used to hold the fiber bundle.

Referring to FIG. 6, another embodiment of the present invention is illustrated. A capillary 14 that has a diameter that is approximately equal to the double clad fiber 10 is used. The capillary 14 must also have an inner diameter that can accommodate the fiber bundle 12. The fiber bundle 12 is inserted into one end of the capillary 14 and the double clad fiber 10 abuts the ends of the fiber bundle 12 and the other end of the capillary 14. Holes (not shown) are drilled into the capillary 14 to allow for fusion arc passage. The ends of the fiber bundle 12 and the double clad fiber 10 are then fusion-spliced together, with the capillary 14 collapsed onto them. The capillary 14 forms a strong protection structure for the fusion splice. In case a resistance heater is used in lieu of the fusion arc, no holes are required in the capillary 14. In an alternative method of assembly, each fiber 13A-13G of the fiber bundle 12 can also be individually inserted into the capillary 14 to align against the end surface 11 of the double clad fiber 10.

Figure 7:
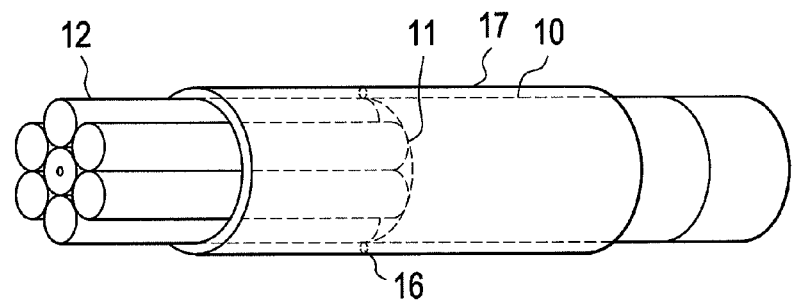
FIG. 7 illustrates an embodiment of the present invention where a glass capillary is used over both the fiber bundle and the double clad fiber.

Referring to FIG. 7, another embodiment of the present invention is illustrated. A capillary 15 that has an inner diameter that is approximately equal to the double clad fiber 10 and the fiber bundle 12 is used. The fiber bundle 12 is inserted into one end of the capillary 17 and the double clad fiber 10 is inserted into the other end of the capillary 17. The ends of the fiber bundle 12 and the end surface 11 of the double clad fiber 10 meet in the middle of the capillary 17, where at least two holes 16 are drilled in the capillary 17 to allow fusion arc passage. The ends of the fiber bundle 12 and the end surface 11 of the double clad fiber 10 are then fusion-spliced together with the capillary 17 collapsed onto them. The capillary 17 forms a strong protection structure for the fusion splice. In case a resistance heater is used in place of the fusion arc, no holes 16 are required in the capillary 17. In an alternative method of assembly, each fiber 13A-13G of the fiber bundle 12 can also be individually inserted into the capillary 17 to align against the end surface 11 of the double clad fiber 10.

In an alternative method of assembly, the glass capillary 17 can also be collapsed onto the splice between the fiber bundle 12 and double clad fiber 10 after the splice is formed to provide protection over the splice.

In any case where the capillary remains after the splicing process, it is preferred that the capillary 17 have a refractive index lower than that of the cladding of the fibers 13A-13G of the fiber bundle 12 and double clad fiber 10 for minimizing transmission loss.

The splice can also be protected with a polymer coating (not shown). In this case, it is again preferred to have the polymer coating's refractive index lower than that of the cladding of the fibers 13A-13G the fiber bundle 12 and double clad fiber 10 for minimizing transmission loss.

Figure 8:
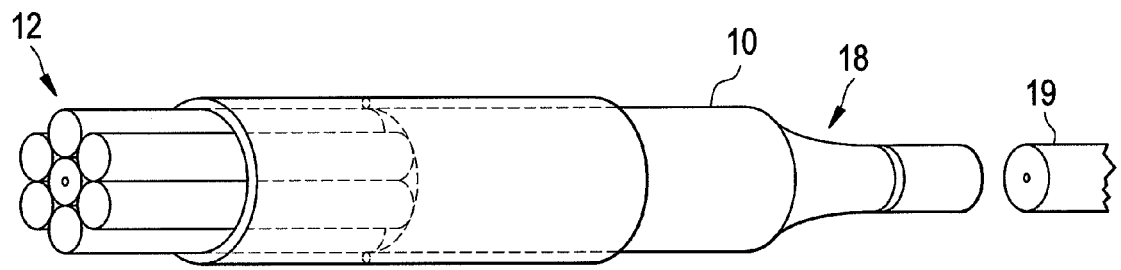
FIG. 8 illustrates an embodiment of the present invention where the double clad fiber is further tapered down to splice to another smaller diameter double clad fiber.

Referring to FIG. 8, another embodiment of the present invention is illustrated. The double clad fiber 10 can be tapered into a smaller diameter to permit splicing to a second double clad fiber 19 with a smaller diameter. The taper 18 is used when the outer diameter of the second double clad fiber 19 is smaller than that of the fiber bundle 12. The taper 18 is much simpler to manufacture than earlier methods, which involve tapering an entire fiber bundle. Since only a single taper 18 is created in the double clad fiber 10, it is much less involved than trying to taper a multitude of fibers at the same time.

This tapering process can have an additional advantage if a pump multiplexing device is used to pump a multimode amplifier that amplifies single mode output. For single mode amplification, there is a need for a mode filter. This is explained in U.S. patent application Ser. No. 09/882,349, filed on Jun. 25, 1997. One method for mode converting is the use of a taper. Preferably, this section of the double clad fiber 10 is tapered to propagate only single mode.

The taper 18 can be produced by this method of making a pump multiplexing device or the method described in U.S. Pat. No. 5,864,644. However, in each case the core of the fiber that carries the signal is a single mode fiber.

The tapering can be performed by locally heating the double clad fiber 10 while pulling on its fiber ends. The heating can be done with either an electric arc or a resistance heater. The Vytran large fiber splicer discussed above has a built-in tapering function.

Referring to FIGS. 9 and 10, embodiments of the present invention for pumping are illustrated. FIG. 9 illustrates a single-ended pumping configuration comprising a fiber bundle 12 that is spliced to a double clad fiber 10, and a capillary 17 protects the splice. The double clad fiber 10 has a taper 18, and is spliced to a second double clad fiber 19, which further comprises a pump 20. The fiber ends of fiber bundle 12 that are not spliced to the double clad fiber 10 are coupled to optical sources (not shown). In a preferred embodiment, the fibers of the fiber bundle 12 that surround a core fiber of the fiber bundle 12 are used for the transmission of multimode light. The multimode core fiber of the fiber bundle 12 is used for the transmission of single mode light.

FIG. 10 illustrates a double-ended pumping configuration comprising fiber bundles 12 and 12A, each of which is spliced to double clad fibers 10 and 10A, respectively. Capillaries 17 and 17A protect the splices. The double clad fibers 10 and 10 each have a taper 18 and 18A, and each is spliced to a second double clad fiber 19, which further comprises a pump 20. The fiber ends of fiber bundles 12 and 12A that are not spliced to the double clad fiber 10 and 10A are coupled to optical sources (not shown). In a preferred embodiment, the periphery fibers of the fiber bundles 12 and 12A are used for the transmission of multimode light. The multimode core fiber of each fiber bundle 12 and 12A is used for the transmission of single mode light.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

The invention claimed is:

1. A cladding pumped optical fiber laser device comprising:
    a cladding pumped fiber laser;
    a plurality of optical sources for optically pumping the cladding pumped fiber laser;
    a plurality of multimode fibers optically coupling the optical sources to the cladding pumped fiber laser, each multimode fiber having a first end coupled to one of the plurality of optical sources and a second end coupled only to a cladding of the cladding pumped fiber laser for coupling multimode light into said cladding of the cladding pumped fiber laser; and
    a fiber having a multimode central core, said fiber being coupled to the cladding pumped fiber laser for coupling single mode light into a central core of the cladding pumped fiber laser,
    wherein the plurality of multimode fibers and the fiber having the multimode central core are bundled together into a fiber bundle, and the fiber bundle being tapered to a reduced cross sectional area prior to being coupled to the cladding pumped fiber laser.

2. A cladding pumped optical fiber laser device comprising:
    a cladding pumped fiber amplifier;
    a plurality of optical sources for optically pumping the cladding pumped fiber amplifier;
    a plurality of multimode fibers optically coupling the optical sources to the cladding pumped fiber amplifier, each multimode fiber having a first end coupled to one of the plurality of optical sources and a second end coupled only to a cladding of the cladding pumped fiber amplifier for coupling multimode light into said cladding of the cladding pumped fiber amplifier; and
    a fiber having a multimode central core, said fiber being coupled to the cladding pumped fiber laser for coupling single mode light into a central core of the cladding pumped fiber amplifier,
    wherein the plurality of multimode fibers and the fiber having the multimode central core are bundled together into a fiber bundle, and the fiber bundle being tapered to a reduced cross sectional area prior to being coupled to the cladding pumped fiber amplifier.

* * * * *